US008183459B2

(12) United States Patent
Wei et al.

(10) Patent No.: US 8,183,459 B2
(45) Date of Patent: May 22, 2012

(54) HANDHELD ELECTRONIC DEVICE AND RISING MECHANISM

(75) Inventors: Chih-Sheng Wei, Taoyuan County (TW); Cheng-Chieh Chuang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 391 days.

(21) Appl. No.: 12/635,663

(22) Filed: Dec. 10, 2009

(65) Prior Publication Data

US 2011/0030988 A1     Feb. 10, 2011

(30) Foreign Application Priority Data

Aug. 10, 2009 (TW) .............................. 98126812 A

(51) Int. Cl.
*H05K 5/00* (2006.01)
(52) U.S. Cl. .. 174/50; 174/58; 361/679.01; 361/679.06; 220/3.3; 455/575.3; 379/433.05
(58) Field of Classification Search ............... 174/50, 174/58; 455/575.3, 575.1; 379/679.01; 361/379.01, 361/679.06, 679.08; 220/3.3; 369/253; 439/535
See application file for complete search history.

(56) References Cited

U.S. PATENT DOCUMENTS

| 7,688,970 | B2* | 3/2010 | Garcia et al. | ............. | 379/433.05 |
| 8,073,506 | B2* | 12/2011 | Kouno et al. | ............. | 455/575.3 |
| 8,094,439 | B2* | 1/2012 | Lin | ............. | 361/679.01 |
| 8,095,191 | B2* | 1/2012 | Gorsica et al. | ............. | 455/575.3 |
| 8,099,134 | B2* | 1/2012 | Dunnam et al. | ............. | 455/566 |
| 2006/0252471 | A1 | 11/2006 | Pan | | |
| 2008/0311963 | A1 | 12/2008 | Strawn | | |

FOREIGN PATENT DOCUMENTS

WO     2006106374     10/2006

OTHER PUBLICATIONS

"Search Report of European Counterpart Application" issued on Feb. 12, 2010, p. 1-p. 6.
"Office Action of Taiwan Counterpart Application", issued on Jan. 11, 2012, p. 1-p. 5, in which the listed reference was cited.

* cited by examiner

*Primary Examiner* — Dhirubhai R Patel
(74) *Attorney, Agent, or Firm* — Jianq Chyun IP Office

(57) ABSTRACT

A handheld electronic device including a first body, a second body, and a rising mechanism is provided. The second body is stacked under the first body. A side of the second body facing the first body has a depression. The rising mechanism is connected between the first body and the second body. The rising mechanism is slidably coupled to the first body, so that when the first body and the second body are relatively spread, the first body slides relative to the rising mechanism. In addition, when the first body reaches a predetermined position, an end of the first body enters the depression, the rising mechanism drives the first body to rotate relative to the second body, and an upper surface of the first body and an upper surface of the second body form an angle.

13 Claims, 4 Drawing Sheets

HANDHELD ELECTRONIC DEVICE AND RISING MECHANISM

CROSS-REFERENCE TO RELATED APPLICATION

This application claims the priority benefit of Taiwan application serial No. 98126812, filed on Aug. 10, 2009. The entirety of the above-mentioned patent application is hereby incorporated by reference herein and made a part of this specification.

BACKGROUND OF THE INVENTION

1. Field of the Application

The application generally relates to a handheld electronic device and a rising mechanism, in particular, to a handheld electronic device in which two bodies are spread to form an angle, and a rising mechanism capable of enabling two bodies to spread and form an angle.

2. Description of Related Art

Recently, with the development of information technology, it is getting easier to acquire desired information from electronic devices in daily life. Further, due to progress in the industrial technology, various types of handheld electronic devices are developed towards a trend of light, thin, short, and small products. Having the characteristic and advantage of being portable, the handheld electronic devices are widely accepted and applied in daily life.

Taking cell phones as an example, in order to conveniently carry the cell phones and satisfy different use preferences and demands, in addition to conventional bar phones, the cell phones also include clamshell phones, twist phones, slide phones, and other common types of phones. For a slide phone, its upper and lower bodies are stacked and capable of sliding relative to each other, so as to achieve different operation modes, for example, an opening mode and a closing mode. The stacking of the upper and lower bodies helps to reduce an entire volume of the slide phone, and the upper and lower bodies may be spread under a specific operation mode.

Here, taking a double-layer slide phone having a keyboard as an example, the slide phone operates in the following manner. A force is applied to make a display screen slide to a side of the keyboard, and the keyboard is thus exposed to enable a user to input easily. However, in this design, the display screen and the keyboard remain in parallel, such that the user needs to change gestures or move the handheld electronic device at any moment to satisfy the demands of inputting through the keyboard and viewing the screen.

SUMMARY OF THE INVENTION

Accordingly, the application is directed to a handheld electronic device and a rising mechanism applicable to the handheld electronic device, so that after being spread, the handheld electronic device is arranged in a manner that is convenient to be held and viewed by a user through the rising mechanism, thereby increasing the convenience for the user to operation.

The application provides a handheld electronic device, which includes a first body, a second body, and a rising mechanism. The second body is stacked under the first body. A side of the second body facing the first body has a depression. The rising mechanism is disposed in the depression, and connected between the first body and the second body. The rising mechanism is slidably coupled to the first body, so that when the first body and the second body are relatively spread, the first body slides relative to the rising mechanism. When the first body reaches a predetermined position, an end of the first body enters the depression, the rising mechanism drives the first body to rotate relative to the second body, and an upper surface of the first body and an upper surface of the second body form an angle.

The application provides a rising mechanism, which is adapted to be connected between a first body and a second body, located in a depression of the second body, and slidably coupled to the first body. When the first body and the second body are relatively spread, the first body slides relative to the rising mechanism. After the first body reaches a predetermined position, an end of the first body enters the depression, the rising mechanism drives the first body to rotate relative to the second body, and an upper surface of the first body and an upper surface of the second body form an angle.

In view of the above, when using the handheld electronic device of the application, the user applies a force to the first body, such that the second body and the first body are relatively spread. After the first body slides to a predetermined position, the rising mechanism drives the first body to rotate relative to the second body and enter the depression of the second body, such that the second body and the first body form an angle. Thereby, the handheld electronic device is easy to be held and viewed, which increases the convenience for the user to operate.

In order to make the aforementioned and other features and advantages of the application comprehensible, embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Figure 1:
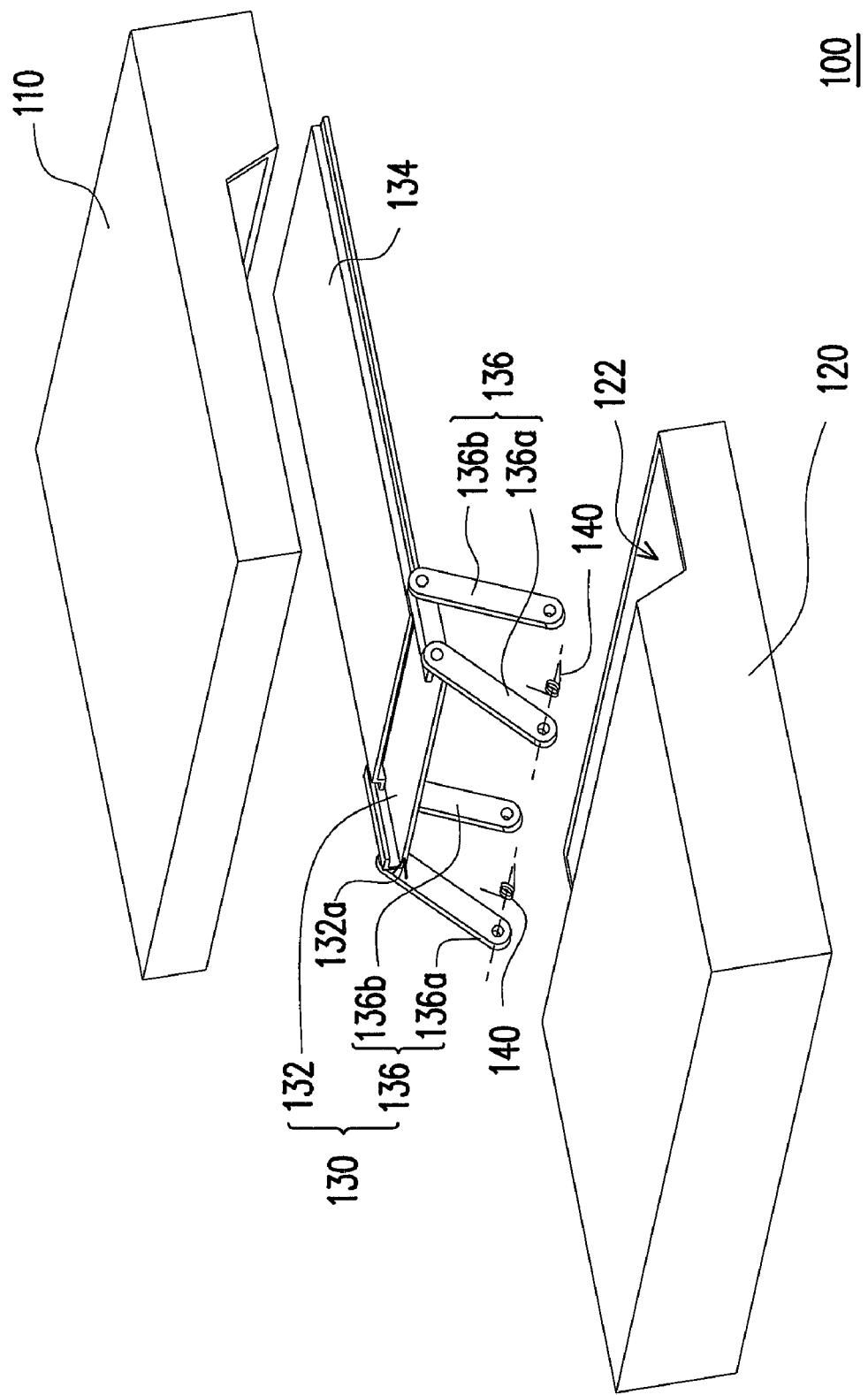
FIG. 1 is a schematic exploded view of a handheld electronic device according to an embodiment of the application.

Reference will now be made in detail to the present embodiments of the application, examples of which are illustrated in the accompanying drawings. Wherever possible, the same reference numbers are used in the drawings and the description to refer to the same or like parts.

FIG. 1 is an exploded view of a handheld electronic device according to an embodiment of the application. Referring to FIG. 1, a handheld electronic device 100 includes a first body 110, a second body 120, and a rising mechanism 130. The first body 110 and the second body 120 are, for example, upper and lower bodies of a slide phone. The second body 120 is stacked under the first body 110, and a side of the second body 120 facing the first body 110 has a depression 122. The rising mechanism 130 is connected between the first body 110 and the second body 120.

In this embodiment, the rising mechanism 130 includes a rising module 136, a first plate 132, and a second plate 134. The second plate 134 is fixed on the first body 110, and the first plate 132 is fixed on the rising module 136. The second plate 134 is connected between the first body 110 and the first plate 132, and the first plate 132 is slidably coupled to the second plate 134, such that the first body 110 is capable of sliding relative to the second body 120. The rising module 136 of this embodiment is, for example, a four bar linkage, and includes first links 136a and second links 136b. The first links 136a and the second links 136b are respectively pivoted between the first plate 132 and the second body 120, in which the second links 136b are connected to an end 132a of the first plate 132, and the first links 136a are connected to the other end of the first plate 132. Moreover, the first links 136a and the second links 136b have different lengths, such that when pivotally rotating relative to the second body 120, the first links 136a and the second links 136b drive the first plate 132 to obliquely enter the depression 122 of the second body 120. It should be noted that the rising module 136 of this embodiment may be replaced by other mechanisms, so as to raise the second body 120. For example, the rising module 136 may be replaced by a torsion hinge, so as to raise the second body 120.

In addition, the rising mechanism 130 further includes an elastic member 140 connected between the second body 120 and the first links 136a. The elastic member 140 includes a torsion spring, for providing a force required to enable the first links 136a to pivotally rotate relative to the second body 120. Another elastic member (not shown), for example, a wind spring, a coil spring, or other elastic members capable of generating a semi-auto sliding effect, may be disposed between the second plate 134 and the first plate 132, so as to provide a restoring force and a driving force required when the first body 110 and the second body 120 are relatively spread or closed. In other words, the handheld electronic device 100 has a semi-auto sliding function.

Figure 2C:
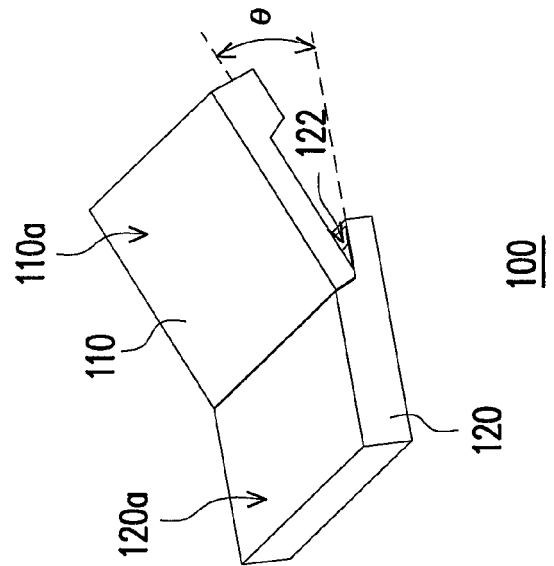
FIGS. 2A to 2C sequentially show an operation process of the handheld electronic device in FIG. 1.
Figure 2B:
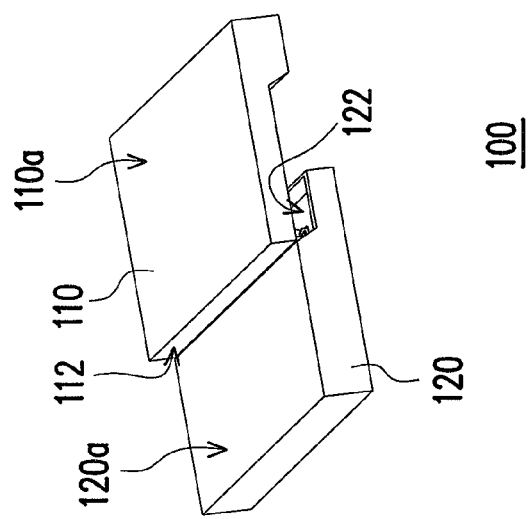
Figure 2A:
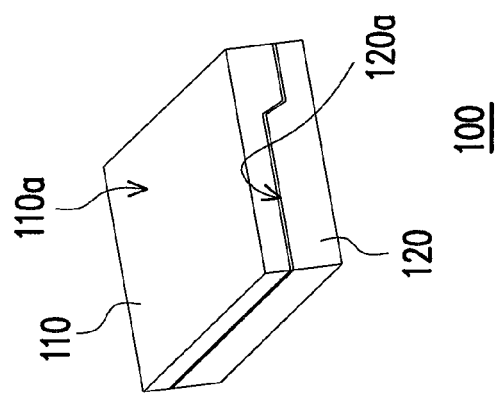
Figure 3C:
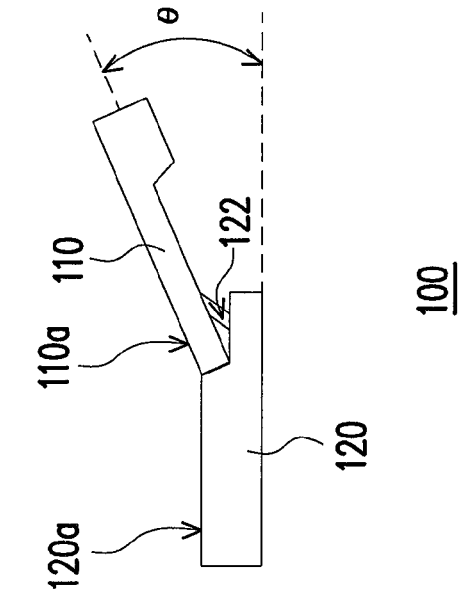
FIGS. 3A to 3C are side views of the handheld electronic device corresponding to the operation process in FIGS. 2A to 2C.
Figure 3B:
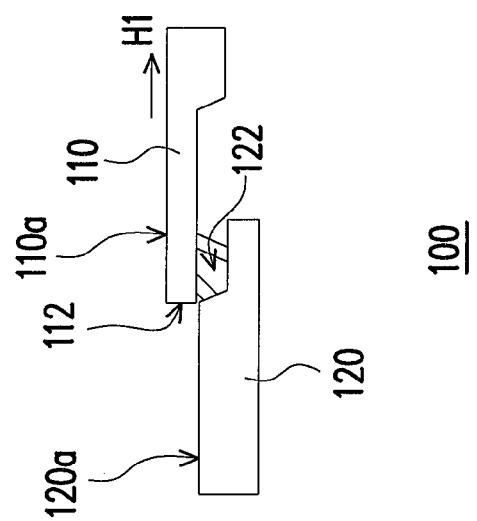
Figure 3A:
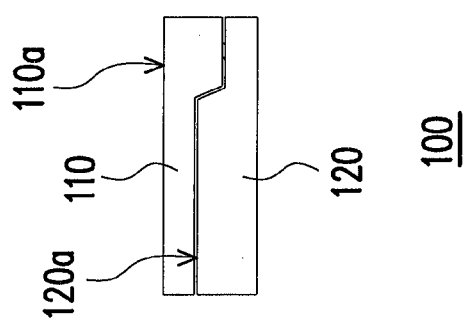
Figure 4C:
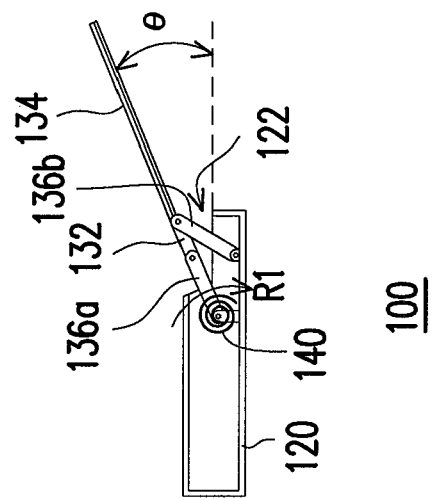
FIGS. 4A to 4C show a cross-sectional structure of the handheld electronic device corresponding to the operation process in FIGS. 2A to 2C.

FIGS. 2A to 2C sequentially show an operation process of the handheld electronic device 100 of the above embodiment, and FIGS. 3A to 3C are side views of the handheld electronic device 100 corresponding to the operation process in FIGS. 2A to 2C. Moreover, in order to clearly describe the operation of the rising mechanism 130 of the handheld electronic device 100, FIGS. 4A to 4C further show a cross-sectional structure of the handheld electronic device 100 corresponding to the operation process in FIGS. 2A to 2C, in which the first body 110 is omitted.

FIGS. 2A to 2C show a process that the first body 110 and the second body 120 of the handheld electronic device 100 change from a state of being stacked over each other to a state of being relatively spread. Firstly, referring to FIGS. 2A, 3A, and 4A, the handheld electronic device 100 is in a stacked state, that is, the first body 110 and the second body 120 are stacked over each other, and the first plate 132, the first links 136a, and the second links 136b are located on initial positions. Here, the first body 110 is still located on the second body 120, such that a moment applied by the elastic member 140 to the first links 136a does not function.

Figure 4B:
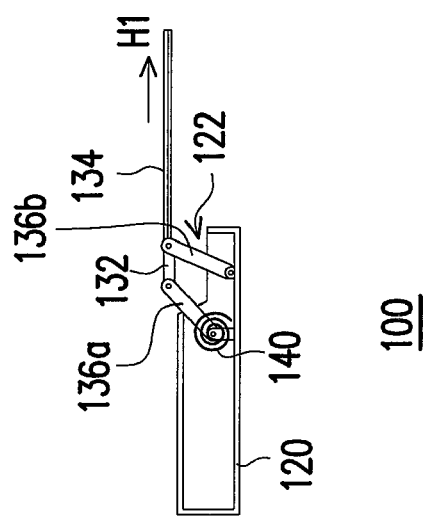
Figure 4A:
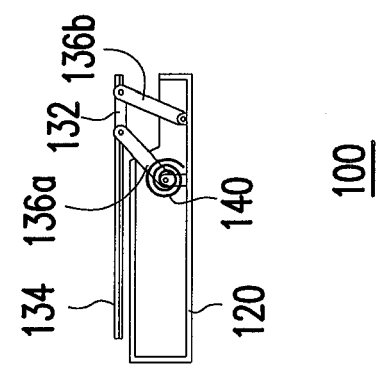

Next, referring to FIGS. 2B, 3B, and 4B, when a user applies a force in a force application direction H1 to push the first body 110 forward for a certain distance, the second plate 134 moves relative to the first plate 132. After the second plate 134 reaches a predetermined position, the elastic member between the second plate 134 and the first plate 132 releases an originally stored elastic potential energy, so as to drive the second plate 134 together with the first body 110 located on the second plate 134 to move relative to the second body 120 and the first plate 132, thereby achieving the semi-auto sliding effect.

Afterward, referring to FIGS. 2C, 3C, and 4C, the first body 110 and the first plate 132 are entirely spread to reach the positions shown in FIGS. 2B, 3B, and 4B, an end 112 of the first body 110 slides to a position above the depression 122, and the moment applied by the elastic member 140 to the first links 136a functions to drive the first links 136a to pivotally rotate relative to the second body 120 in a direction R1. However, even if the electric member 140 is not disposed in this embodiment, the same effect may be achieved through a downward force of pushing the first body 110 by the user.

In this embodiment, as the second links 136b and the first links 136a have different lengths, under the driving force of the first links 136a and the actuation of the second links 136b, the first plate 132 together with the end 112 of the first body 110 obliquely enters the depression 122 of the second body 120 and is located in the depression 122. In other words, the first body 110 and the second body 120 maintain an angle θ. In this manner, when operating the handheld electronic device 100, the user may hold the second body 120 and view a display interface on the first body 110, so that the operation of the user becomes more convenient.

In addition, in this embodiment, an upper surface 110a of the first body 110 and an upper surface 120a of the second body 120 form a continuous surface. In other words, the upper surface 110a of the first body 110 and the upper surface 120a of the second body 120 nearly have no height difference. Particularly, by adjusting a depth of the depression 122 of the second body 120, the lengths and moving paths of the first links 136a and the second links 136b, a thickness of the first body 110, and other design parameters, the above design requirement is achieved, so as to enhance the aesthetic feeling of the appearance of the handheld electronic device 100 and the hand feeling of the user during the operation.

In another aspect, when intending to restore the handheld electronic device 100 in the spread state to the stacked state, the user only needs to reverse the process, such that the first body 110 and the second body 120 being relatively spread are restored to the state of being stacked over each other. Briefly, under the state as shown in FIGS. 2C, 3C, and 4C, the other end of the first body 110 relative to the end 12 is pressed downward, the first plate 132 and the end 112 of the first body 110 depart from the depression 122 of the second body 120, and the first plate 132, the second plate 134, and the first body 110 are restored to a horizontal state as shown in FIGS. 2B, 3B, and 4B. Next, the first body 110 is pushed in a direction opposite to H1, such that the first body 110 and the second plate 134 are enabled to move from the positions shown in FIGS. 2B, 3B, and 4B to the initial positions shown in FIGS. 2A, 3A, and 4A. During the process that the first body 110 and the second plate 134 are enabled to move from the positions shown in FIGS. 2B, 3B, and 4B to the initial positions shown in FIGS. 2A, 3A, and 4A, the elastic member between the second plate 134 and the first plate 132 also provides the semi-auto sliding effect. Therefore, after moving relative to the second body 120 for a certain distance, the first body 110 is automatically restored to the state of being stacked over the second body 120 through the elastic restoring force of the elastic member.

To sum up, in the handheld electronic device according to the present application, the first body and the second body form an angle after being relatively spread through the rising mechanism, which makes it easy for the user to hold and view the handheld electronic device, thereby increasing the convenience for the user to operate. In addition, according to the present application, after the handheld electronic device is spread, the upper surface of the first body and the upper surface of the second body form a continuous bending surface, so as to simplify the appearance of the handheld electronic device.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A handheld electronic device, comprising:
   a first body;
   a second body, stacked under the first body, wherein a side of the second body facing the first body comprises a depression; and
   a rising mechanism, connected between the first body and the second body, wherein the rising mechanism comprises a rising module, a first plate, and a second plate, the second plate is fixed on the first body, the first plate is fixed on the rising module, and the first plate is slidably coupled to the second plate, and when the first body and the second body are relatively spread, the first body slides relative to the first plate, and when the first body reaches a predetermined position, an end of the first body enters the depression, the rising mechanism drives the first body to rotate relative to the second body, and an upper surface of the first body and an upper surface of the second body form an angle.

2. The handheld electronic device according to claim 1, wherein after the first body enters the depression, the upper surface of the first body and the upper surface of the second body form a continuous surface.

3. The handheld electronic device according to claim 1, wherein the rising module comprises a plurality of links, and two ends of each link are respectively pivoted to the second body and the first plate.

4. The handheld electronic device according to claim 3, wherein the links are configured as a four bar linkage.

5. The handheld electronic device according to claim 3, wherein the rising mechanism further comprises an elastic member, connected between the second body and the links.

6. The handheld electronic device according to claim 5, wherein the elastic member comprises a torsion spring.

7. The handheld electronic device according to claim 1, wherein the rising module comprises a torsion hinge.

8. A rising mechanism, adapted to be connected between a first body and a second body, located in a depression of the second body, wherein the rising mechanism comprises a rising module, a first plate, and a second plate, the second plate is fixed on the first body, the first plate is fixed on the rising module, and the first plate is slidably coupled to the second plate, and when the first body and the second body are relatively spread, the first body slides relative to the first plate, and after the first body reaches a predetermined position, an end of the first body enters the depression, the rising mechanism drives the first body to rotate relative to the second body, and an upper surface of the first body and an upper surface of the second body form an angle.

9. The rising mechanism according to claim 8, wherein the rising module comprises a plurality of links, and two ends of each link are respectively pivoted to the second body and the first plate.

10. The rising mechanism according to claim 9, wherein the links are configured as a four bar linkage.

11. The rising mechanism according to claim 9, further comprising an elastic member, connected between the second body and the links.

12. The rising mechanism according to claim 11, wherein the elastic member comprises a torsion spring.

13. The rising mechanism according to claim 8, wherein the rising module comprises a torsion hinge.

* * * * *